US012340786B2

(12) United States Patent
Bryan-Merrett et al.

(10) Patent No.: US 12,340,786 B2
(45) Date of Patent: Jun. 24, 2025

(54) ADAPTIVE NOISE-CANCELING WITH DYNAMIC FILTER SELECTION BASED ON MULTIPLE NOISE SENSOR SIGNAL PHASE DIFFERENCES

(71) Applicant: CIRRUS LOGIC INTERNATIONAL SEMICONDUCTOR LTD., Edinburgh (GB)

(72) Inventors: John Bryan-Merrett, Edinburgh (GB); Mert Salahi, Phoenix, AZ (US); Wilbur Lawrence, Tempe, AZ (US); Samuel P. Ebenezer, Gilbert, AZ (US); Rachid Kerkoud, Gilbert, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 482 days.

(21) Appl. No.: 17/875,364

(22) Filed: Jul. 27, 2022

(65) Prior Publication Data

US 2024/0038211 A1 Feb. 1, 2024

(51) Int. Cl.
*G10K 11/178* (2006.01)

(52) U.S. Cl.
CPC .. *G10K 11/17885* (2018.01); *G10K 11/17853* (2018.01); *G10K 11/17881* (2018.01)

(58) Field of Classification Search
CPC ....... G10K 11/17815; G10K 11/17885; G10K 2210/1081
See application file for complete search history.

(56) References Cited

U.S. PATENT DOCUMENTS

| | | | |
|---|---|---|---|
| 8,645,444 B2 | 2/2014 | Clemow et al. | |
| 8,718,291 B2 | 5/2014 | Alves et al. | |
| 8,908,877 B2 | 12/2014 | Milani et al. | |

(Continued)

FOREIGN PATENT DOCUMENTS

| | | |
|---|---|---|
| GB | 2455828 A | 6/2009 |

OTHER PUBLICATIONS

U.S. Patent Application: "Active Noise Cancellation System Using Infinite Impulse Response Filtering", U.S. Appl. No. 17/468,990, filed Sep. 8, 2021. (32 pgs. in pdf).

(Continued)

*Primary Examiner* — Ping Lee
(74) *Attorney, Agent, or Firm* — Mitch Harris, Atty at Law, LLC; Andrew M. Harris

(57) ABSTRACT

An adaptive noise-canceling system generates an anti-noise signal with a filter that has a response controlled by a set of coefficients selected from a collection of coefficient sets. The adaptive noise-canceling system includes an acoustic output transducer for reproducing a signal containing the anti-noise signal, a first microphone for measuring ambient noise at a first location to produce a first noise measurement signal, a second microphone for measuring the ambient noise at a second location to generate a second noise measurement signal, and an analysis subsystem for analyzing the first noise measurement signal and the second noise measurement signal. The adaptive noise-canceling system also includes a controller that selects the set of coefficients from the collection of coefficient sets according to a phase difference between the first noise measurement signal and the second noise measurement signal as determined by the analysis subsystem.

32 Claims, 7 Drawing Sheets

(56) References Cited

U.S. PATENT DOCUMENTS

| | | | | |
|---|---|---|---|---|
| 9,106,989 | B2 | 8/2015 | Li et al. | |
| 9,224,382 | B2 | 12/2015 | Clemow | |
| 9,711,130 | B2 | 7/2017 | Hendrix et al. | |
| 10,431,198 | B2 | 10/2019 | Magrath et al. | |
| 2010/0061564 | A1 | 3/2010 | Clemow et al. | |
| 2021/0304725 | A1 * | 9/2021 | Kannan ............ | G10K 11/17813 |
| 2022/0223133 | A1 * | 7/2022 | Mccutcheon .... | G10K 11/17825 |

OTHER PUBLICATIONS

U.S. Patent Application: "Feed-Forward Adaptive Noise-Canceling With Dynamic Filter Selection Based On Classifying Acoustic Environment", U.S. Appl. No. 17/858,771, filed Jul. 6, 2022. (48 pgs. in pdf).

* cited by examiner

ADAPTIVE NOISE-CANCELING WITH DYNAMIC FILTER SELECTION BASED ON MULTIPLE NOISE SENSOR SIGNAL PHASE DIFFERENCES

BACKGROUND

1. Field of Disclosure

The field of representative embodiments of this disclosure relates to audio signal processing methods and circuits that suppress ambient noise with a filter having a dynamically selectable response, in which filter selection is made based on reference and error signal phase differences.

2. Background

Personal audio devices, including personal communications devices are frequently operated in the vicinity of ambient noise sources, such as room noise, traffic noise, machinery noise, etc. Performance of such devices with respect to intelligibility of voice communications or program audio can be improved by providing noise-canceling using a microphone to measure ambient acoustic events and then using signal processing to insert an anti-noise signal into the output of the device to cancel the ambient acoustic events/noise.

Since the acoustic environment around the personal audio devices may change dramatically, depending on the sources of noise that are present and the position of the device itself, it is generally desirable to adapt the noise canceling to take into account such environmental changes. In particular, for earspeakers, the "fit" of the earspeakers to the user's ears may alter the performance of the noise canceling system significantly. Adaptive noise canceling circuits, in particular those that can adapt to both the ambient noise and the position of the device or fit of earspeakers, can be complex, consume additional power, and may generate undesirable results under certain circumstances, including instabilities due to changes in the acoustic environment. In order to provide effective noise-canceling, the latency of the anti-noise signal with respect to the reference source from the microphone also must be maintained at a minimal delay.

Therefore, it would be advantageous to provide a low power audio processing system for a personal audio device that effectively cancels ambient noise, while adapting to changes in the acoustic environment of the device, including earspeaker fit and/or device positioning.

SUMMARY

Reduced complexity/power of an adaptive noise-canceling system that adapts to changes in the acoustic environment of a personal audio device may be accomplished in systems and their methods of operation.

The adaptive noise-canceling system generates an anti-noise signal with a filter. The filter has a response controlled by a set of coefficients selected from a collection of coefficient sets. The adaptive noise-canceling system includes an acoustic output transducer for reproducing a signal containing the anti-noise signal, a first microphone for measuring ambient noise at a first location to produce a first noise measurement signal, a second microphone for measuring the ambient noise at a second location to generate a second noise measurement signal, and an analysis subsystem for analyzing the first noise measurement signal and the second noise measurement signal. The adaptive noise-canceling system also includes a controller that selects the set of coefficients from the collection of coefficient sets according to a phase difference between the first noise measurement signal and the second noise measurement signal as determined by the analysis subsystem.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses adaptive noise-canceling (ANC) systems that generate an anti-noise signal with a filter having a response controlled by a set of coefficients selected from a collection of coefficient sets. The adaptive noise-canceling system may include an acoustic output transducer for reproducing a signal containing the anti-noise signal, a first microphone for measuring ambient noise at a first location to produce a first noise measurement signal, a second microphone for measuring the ambient noise at a second location to generate a second noise measurement signal, and an analysis subsystem for analyzing the first noise measurement signal and the second noise measurement signal. The adaptive noise-canceling system may also include a controller that selects the set of coefficients from the collection of coefficient sets according to a phase difference between the first noise measurement signal and the second noise measurement signal as determined by the analysis subsystem. The filter may be an infinite-impulse response (IIR) filter or a finite-impulse response (FIR) filter and another adaptive filter may be included to model a secondary electro-acoustic path between the output of the ANC system and an error microphone that measures the acoustic output of the acoustic output transducer. Selective operation may be provided between the selection of coefficients according to the phase difference and selection of coefficients according to a classification of the secondary electro-acoustic path, depending on the presence or absence of playback audio in the ANC system. The ANC system may first adjust a gain applied to the anti-noise signal according to a coarse phase measurement, and then select the coefficient set to adapt the filter according to a phase difference across multiple frequency bins.

Figure 1:
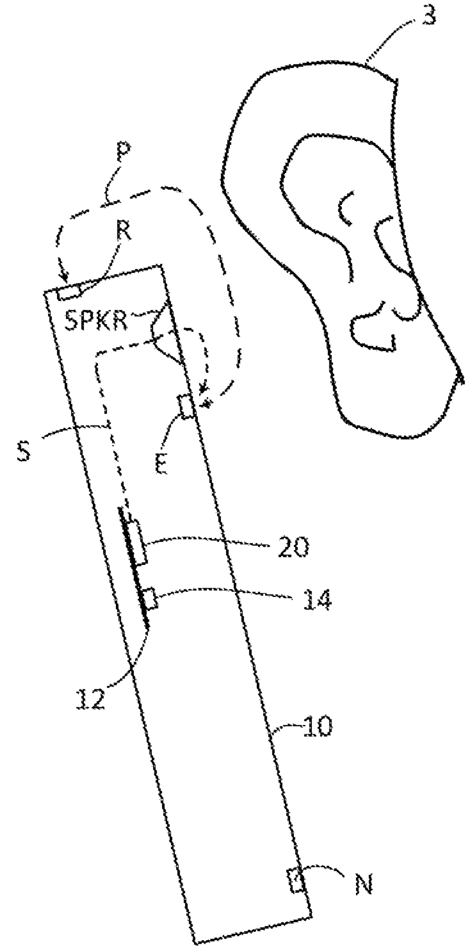
FIG. 1 is an illustration of an example wireless telephone 10, which is an example of a personal audio device in which the techniques disclosed herein may be implemented, in accordance with an embodiment of the disclosure.

Referring now to FIG. 1, an illustration of an example wireless telephone 10 is shown, which is an example of a personal audio device in which the techniques disclosed herein may be implemented, in accordance with an embodiment of the disclosure. Wireless telephone 10 includes a transducer such as speaker SPKR that reproduces distant speech received by wireless telephone 10, along with other local audio events such as ringtones, stored audio program material, near-end speech (i.e., the speech of the user of wireless telephone 10), sources from web-pages or other network communications received by wireless telephone 10 and audio indications such as battery low and other system event notifications. A near-speech microphone N is provided to capture near-end speech, which is transmitted from wireless telephone 10 to the other conversation participant(s).

Wireless telephone 10 includes adaptive noise canceling (ANC) circuits and systems that inject an anti-noise signal into speaker SPKR to improve intelligibility of the distant speech and other audio reproduced by speaker SPKR. A reference microphone R may be provided for measuring the ambient acoustic environment and positioned away from a typical position of a user's mouth, so that the near-end speech is minimized in the signal produced by reference microphone R. A third microphone, error microphone E, may be provided in order to further improve ANC operation by providing a measure of the ambient audio combined with the audio reproduced by speaker SPKR close to an ear 3 of the user, when wireless telephone 10 is in proximity to ear 3. A circuit 12 within wireless telephone 10 may include an audio CODEC integrated circuit 20 that receives the signals from reference microphone R, near-speech microphone N, and error microphone E and interfaces with other integrated circuits such as an RF integrated circuit 14 containing the wireless telephone transceiver. In some embodiments of the disclosure, the circuits and techniques disclosed herein may be incorporated in a single integrated circuit that contains control circuits and other functionality for implementing the entirety of the personal audio device, such as an MP3 player-on-a-chip integrated circuit. In the depicted embodiments and other embodiments, the circuits and techniques disclosed herein may be implemented partially or fully in software and/or firmware embodied in computer-readable storage media and executable by a processor circuit or other processing device such as a microcontroller.

In general, the ANC techniques disclosed herein measure ambient acoustic events and noise (as opposed to the output of speaker SPKR and/or the near-end speech) impinging on error microphone E and/or reference microphone R. The ANC processing circuits of illustrated wireless telephone 10 generate an anti-noise signal generated from the output of error microphone E and/or reference microphone R to have a characteristic that minimizes the amplitude of the ambient acoustic events present at error microphone E, although continuous and exact estimation of the required anti-noise signal is not a requirement of the disclosure. In particular, compensation for an acoustic path P that extends from reference microphone R to error microphone E may be performed adaptively and/or may be selected, and may be implemented by a feed-forward filter, a feedback filter or a feed-forward/feedback combined filter response that is adapted to a particular user by measuring a phase difference between multiple microphone signals in acoustic environment of wireless telephone 10. In the example ANC systems, the filter compensates for acoustic path P, combined with removing effects of an electro-acoustic path S that represents the response of the audio output circuits of CODEC IC 20 and the acoustic/electric transfer function of speaker SPKR including the coupling between speaker SPKR and error microphone E in the particular acoustic environment, i.e., including the fit and head/ear characteristics of the user. Electro-acoustic path S is affected by the proximity and structure of ear 5 and other physical objects and human head structures that may be in proximity to wireless telephone 10, in particular, when wireless telephone 10 is not firmly pressed to ear 5. While the illustrated wireless telephone 10 includes a two microphone ANC system with a third near-speech microphone N, other systems that do not include separate error and reference microphones may implement the above-described techniques. Alternatively, near-speech microphone N may be used to perform the function of the reference microphone R in the above-described system. Also, in personal audio devices designed only for audio playback, near-speech microphone N will generally not be included, and the near-speech signal paths in the circuits described in further detail below may be omitted without changing the scope of the disclosure.

The techniques disclosed herein may also be applied in purely noise-canceling systems that do not reproduce a playback signal or conversation using the output transducer, i.e., those systems that only reproduce an anti-noise signal. As used in this disclosure, the terms "headphone" and "speaker" refer to any acoustic transducer intended to be mechanically held in place proximate to a user's ear canal and include, without limitation, earphones, earbuds, and other similar devices. As more specific examples, "earbuds" or "headphones" may refer to intra-concha earphones, supra-concha earphones and supra-aural earphones. Further, the techniques disclosed herein are applicable to other forms of acoustic noise canceling, and the term "transducer" includes headphone or speaker type transducers, but also other vibration generators such as piezo-electric transducers, magnetic vibrators such as motors, and the like. The term "sensor" includes microphones, but also includes vibration sensors such as piezo-electric films, and the like.

Figure 2:
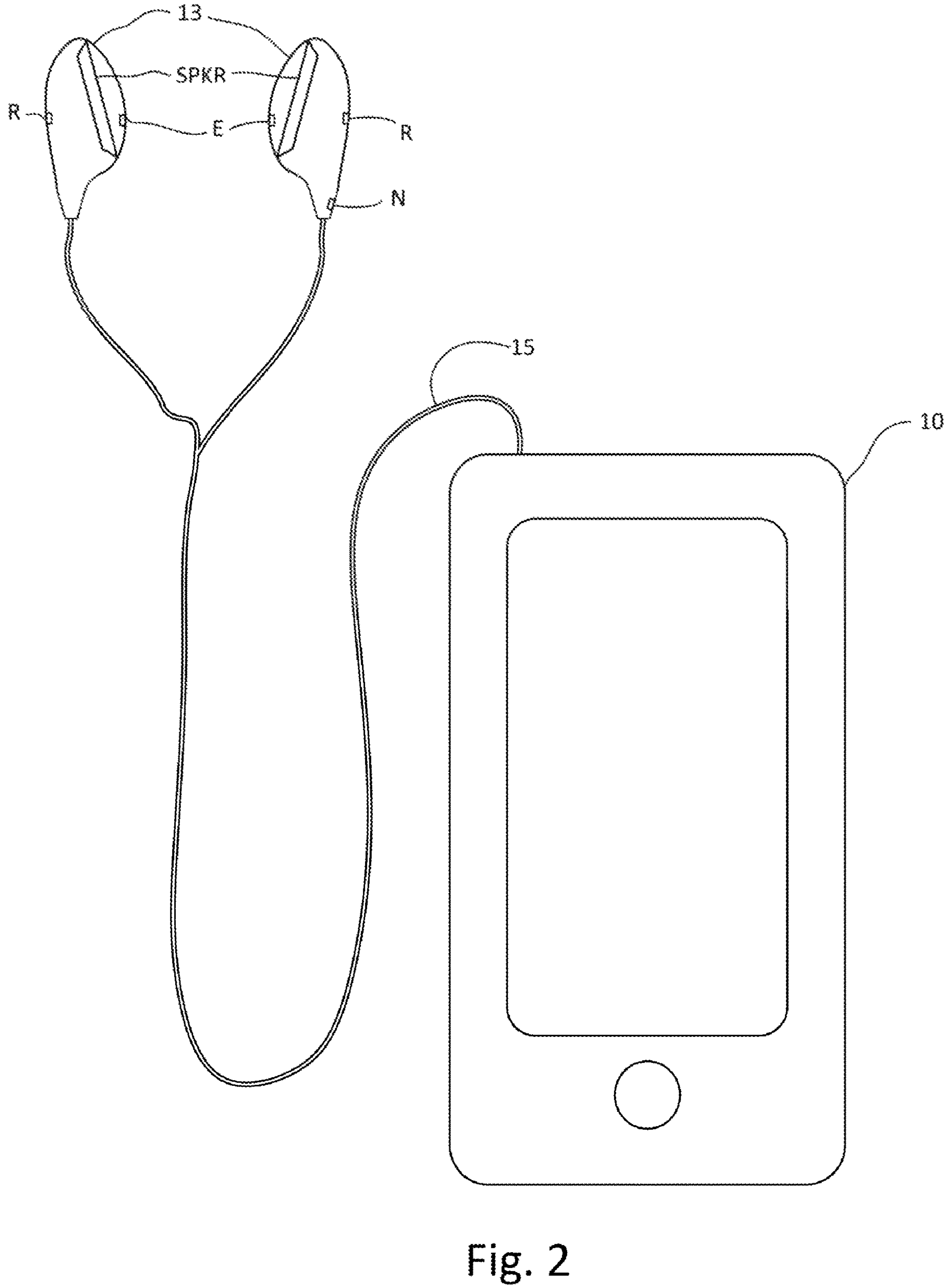
FIG. 2 is an illustration of a wireless telephone 10 coupled to a pair of earphones 13, which is an example of a personal audio system in which the techniques disclosed herein may be implemented, in accordance with an embodiment of the disclosure.

Referring now to FIG. 2, another example wireless telephone configuration in which the techniques disclosed herein may be implemented is shown, in accordance with an embodiment of the disclosure. FIG. 2 shows wireless telephone 10 and a pair of earphones 13, which may be attached to, or inserted in, a corresponding ear of a listener. Illustrated wireless telephone 10 is an example of a device in which the techniques herein may be employed, but it is understood that not all of the elements or configurations illustrated in wireless telephone 10, or in the circuits depicted in subsequent illustrations, are required. Wireless telephone 10 is connected to earbuds 13 by a wired or wireless connection, e.g., a BLUETOOTH™ connection (BLUETOOTH is a trademark of Bluetooth SIG, Inc.). A wired connection is additionally illustrated, including a cable 15. Earbuds 13 may each have a corresponding transducer, such as speaker SPKR, which reproduces source audio that may include distant speech received from wireless telephone 10, ringtones, stored audio program material, and injection of near-end speech (i.e., the speech of the user of wireless telephone 10) as sidetone information. The source audio may also include any other audio that wireless telephone 10 is required to reproduce, such as source audio from web-pages or other network communications received by wireless telephone 10, and audio indications such as battery low and other system event notifications. Reference microphones R may be provided on a surface of the housing of respective earbuds 13 for measuring noise in the ambient acoustic environment. Another pair of microphones, error microphones E, may be provided in order measure the above-described acoustic environment corresponding to secondary path S, by providing a measure of the ambient audio combined with the audio reproduced by respective speakers SPKR close to corresponding ear, when earphones 13 are inserted in the outer portion of the users ear. As in wireless telephone 10 of FIG. 1, wireless telephone 10 includes adaptive noise canceling (ANC) circuits and systems that inject an anti-noise signal into speakers SPKR to improve intelligibility of the distant speech and other audio reproduced by speakers SPKR. In the depicted example, an ANC circuit within wireless telephone 10 receives the signals from reference microphones R and error microphones E. Alternatively, all or a portion of the ANC circuits disclosed herein may be incorporated within earbuds 13. For example, each of earbuds 13 may constitute a stand-alone acoustic noise canceler including a separate ANC circuit. Near-speech microphone N may be provided on the outer surface of a housing of one of earphones 13, on a boom affixed to one of earphones 13, or on a com-box pendant located between wireless telephone 10 and either or both of earphones 13 along cable 15.

Figure 3:
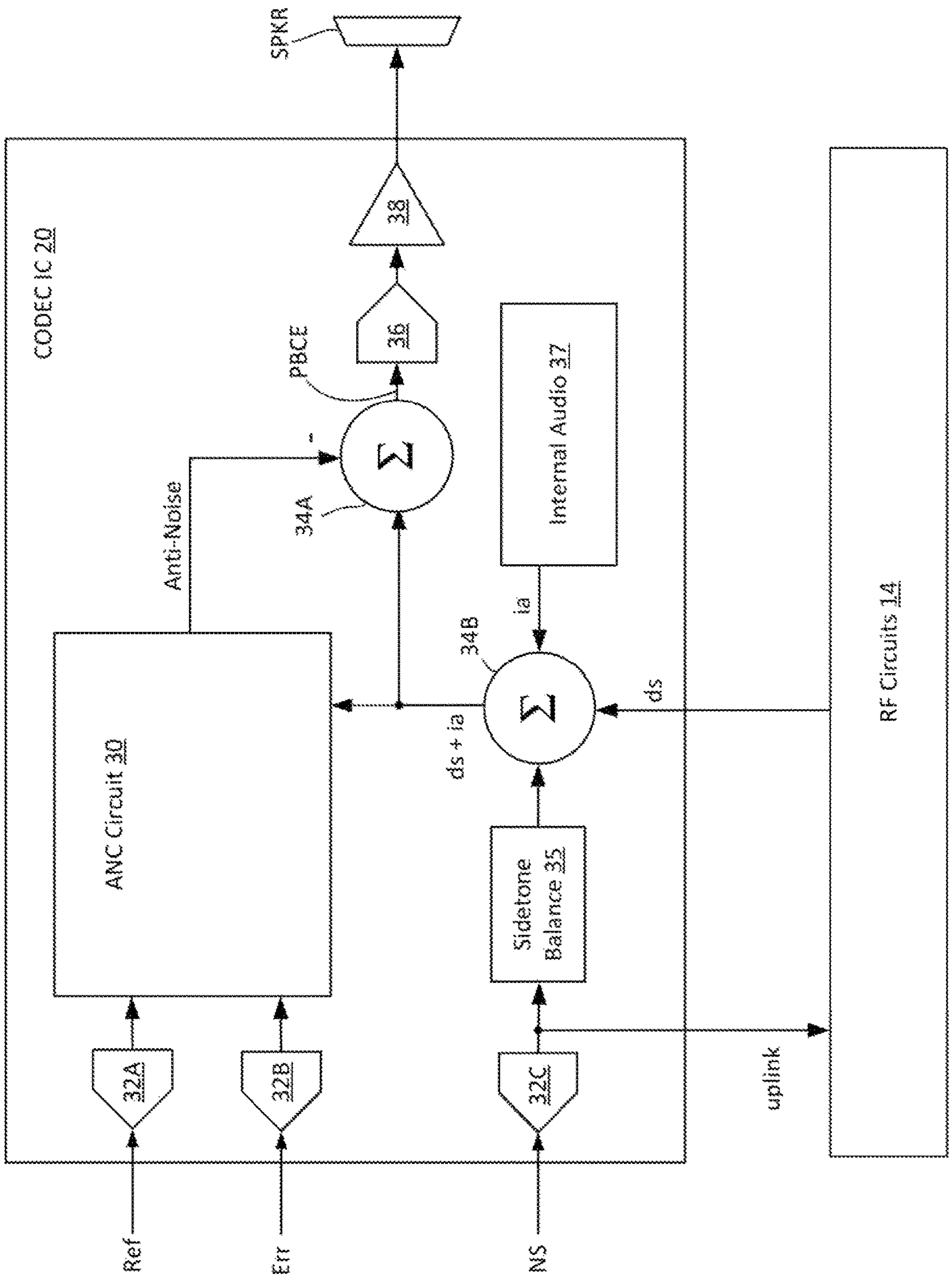
FIG. 3 is a block diagram illustrating example circuit blocks within example wireless telephone of FIG. 1 and FIG. 2, in accordance with an embodiment of the disclosure.

Referring now to FIG. 3, a block diagram illustrating example circuit blocks within example wireless telephone of FIG. 1 and FIG. 2 is shown, in accordance with an embodiment of the disclosure. Audio CODEC integrated circuit (IC) 20 receives a reference microphone signal Ref and an analog-to-digital converter (ADC) 32A converts reference microphone signal Ref to a digital representation provided to an ANC circuit 30, which generates the anti-noise signal Anti-Noise. Audio CODEC integrated circuit 20 also includes an ADC 32B for receiving an error microphone signal Err from error microphone E and generating a digital representation of the error microphone signal, and an ADC 32C for receiving near-speech microphone signal NS from near-speech microphone N and generating a digital representation of near-speech microphone signal N. Audio CODEC integrated circuit 20 generates an output for driving speaker SPKR from an amplifier 38, which amplifies the output of a digital-to-analog converter (DAC) 36 that receives the output of a combiner 34A. Combiner 34A combines anti-noise signal Anti-Noise with a combined playback audio signal ds+ia received from another combiner 34B that combines an internal audio signal ia received from internal audio sources 37 with a downlink audio signal ds received from RF (Radio Frequency) circuits block 14 and a sidetone signal received from a sidetone balancing circuit 35. Anti-noise signal anti-noise is generated by ANC circuit 30 with the same polarity as the noise in error microphone signal err and reference microphone signal ref and is therefore subtracted from the combined playback audio ds+ia by combiner 34A. Sidetone balancing circuit 35 receives the near-speech signal NS representation from ADC 32C and performs equalization, including gain adjustment to inject an appropriate amount of near speech signal NS across a frequency range expected for speech, so that the user of wireless telephone 10 hears their own voice in proper relation to downlink speech ds. The near speech signal NS representation from ADC 32C is also provided to RF circuits block 14 as an uplink audio signal uplink for transmission to a call destination endpoint.

Figure 4:
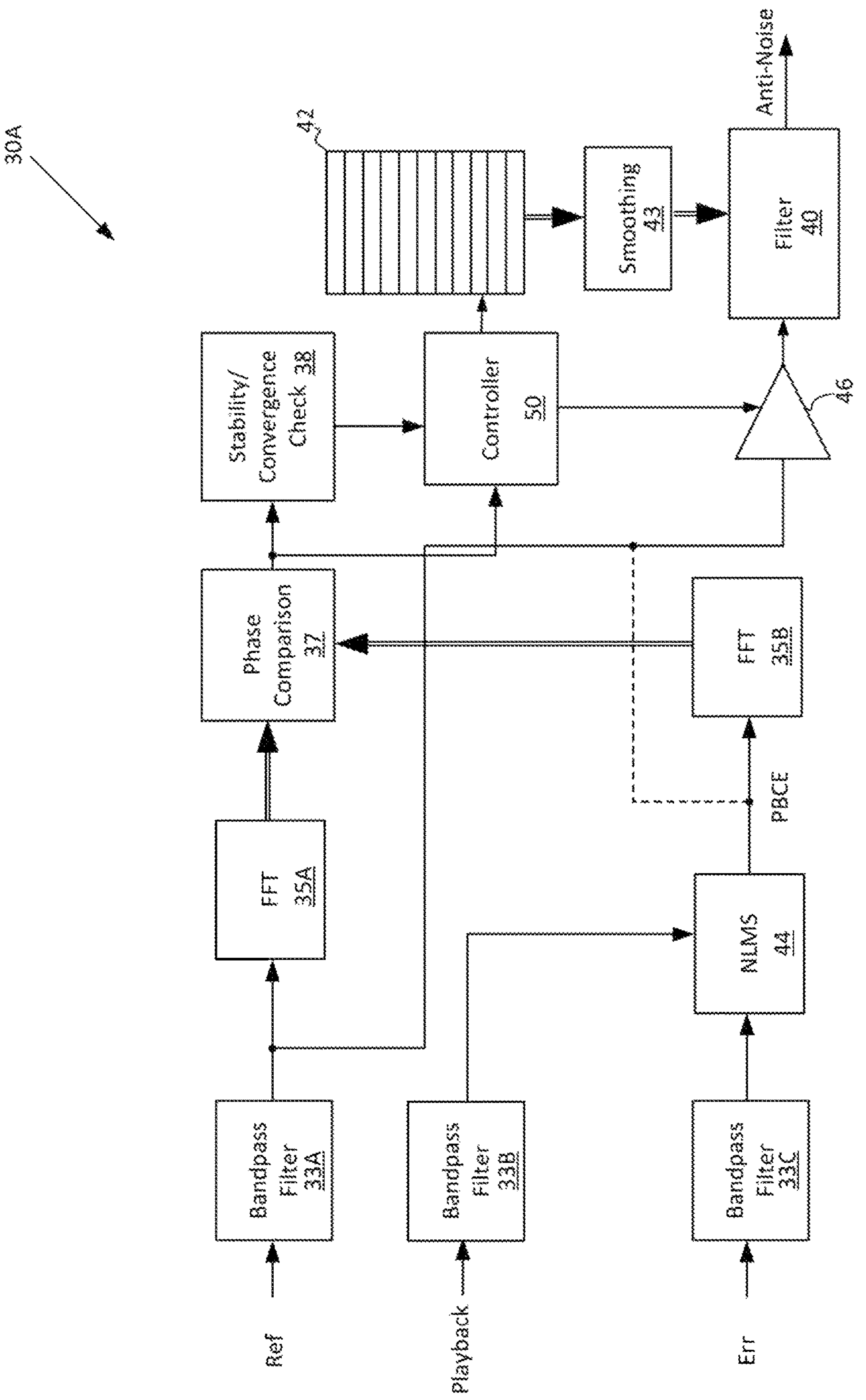
FIG. 4 is a block diagram illustrating an example adaptive noise canceling (ANC) circuit 30A that may be used to implement ANC circuit 30 of FIG. 3, in accordance with an embodiment of the disclosure.

Referring now to FIG. 4, a block diagram illustrates an example ANC circuit 30A that may be used to implement ANC circuit 30 of FIG. 3, in accordance with an embodiment of the disclosure. While reference may be made to signals, it is understood that ANC circuit 30A is generally a digital signal processing (DSP) system that operates on digital representations of signals. A filter 40, which may be an IIR filter, or a FIR filter, receives reference microphone signal Ref that is provided from bandpass filter 33A and applies a transfer function W(z) to be P(z)/S(z) to generate the anti-noise signal. A gain of transfer function may be adjusted by an adjustable-gain stage 46. The coefficients of adaptive filter 40 are selected as a set of coefficients from a W coefficient lookup table 42 by a controller 50 and are selected to reduce components of reference microphone signal ref that are in the audible frequency range for a nominal user that corresponds to the selected set of coefficients. The coefficients are not necessarily typical coefficients of a filter transfer function, but may include selection between different filter topologies, including, for example, selection between sets of custom-designed filters of differing topologies that might be implemented by the physical architecture of filter 40, which may be, for example a reconfigurable digital, analog or hybrid mixed-signal processing block. The selection of a particular set of coefficients for filter 40 selects a particular corresponding frequency response to be applied to reference microphone signal Ref to generate anti-noise signal Anti-Noise for the nominal user, and is performed in response to a phase measurement between reference microphone signal Ref and an error signal Err. Error microphone signal Err is provided through another bandpass filter 33C, which may have characteristics matched to bandpass filter 33A to prevent any phase/frequency response differences from affecting the measurements performed by example ANC circuit 30A. A playback audio Playback is removed from error microphone signal Err by subtracting playback audio Playback with an adaptive noise least-means-squares (NLMS) adaptive filtering subsystem 44 that receives playback audio Playback from another bandpass filter 33B that may have characteristics matched to bandpass filters 33A, 33C to prevent introduction of any phase/frequency-dependent error. NMLS adaptive filtering subsystem 44 generates a playback corrected error signal PBCE that represents a difference between error microphone signal Err and playback audio Playback after transmission through secondary electro-acoustic path S. Playback-corrected error signal PBCE should contain only the non-playback signal (noise) components present in error microphone signal Err.

A pair of fast-Fourier transform (FFT) analysis blocks 35A and 35B analyze reference microphone signal Ref and playback-corrected error signal PBCE and a phase comparison block 37 provides a comparison between the phase of the noise signals present in reference microphone signal Ref and error microphone signal Err. A stability/convergence check block 38 analyzes the phase difference output(s) of phase comparison block 37 to determine whether a reliable phase difference has been obtained, i.e., whether or not the phase difference is changing and/or whether the changes appear to be due to gradual shifts, or due to instability. Controller 50 receives the phase difference information from phase comparison block 37 and stability/convergence information from stability/convergence check block 38, and first adjusts the gain of adjustable gain stage 46 to obtain a stable phase measurement. Once a stable phase measurement has been obtained, controller 50 fixes the gain of adjustable gain stage 46 and begins selecting coefficient sets 42 to adjust the phase difference between reference microphone signal Ref and playback-corrected error signal PBCE to obtain a target phase difference, which is nominally 90 degrees. The phase of reference microphone signal Ref is ideally not dependent on the response provided by the combination of adjustable gain stage 46 and filter 40, as anti-noise signal Anti-Noise should not be introduced to reference microphone R by acoustic output transducer SPKR. Any leakage between acoustic output transducer SPKR and reference microphone R may be removed by other known adaptive filter techniques, or can be disregarded.

Phase comparison block 37 may provide phase difference information for multiple frequency bins represented by the outputs of FFT analysis blocks 35A, 35B, and controller 50 may observe the phase differences to inform selection of a next coefficient set that controller 50 selects from lookup table 42, and changes from one coefficient set to the next may be smoothed by a smoothing block 43, which may interpolate between coefficients as changes in coefficient sets are applied. Lookup table 42 generally provides fine gradations in response that may be indexed by an amount of phase difference indicated by the output(s) of phase comparison block 37 and/or by a phase trend across multiple frequency bins, i.e., a change of phase from bin-to-bin that is progressive in one direction may indicate a direction in lookup table 42 in which controller 50 should advance selection. In general, ANC system 30A may provide low power consumption, in that the portion of ANC system 30A other than adjustable gain stage 46, filter 40, and the data path from reference microphone signal Ref to adjustable gain stage 46, may operate at a much lower sample rate than filter 40. The lower sample rate of the other blocks in ANC system 30A does not affect the latency of filter 40 in performing noise-canceling, and thus provides an example of a low-latency noise-canceling solution that can be performed with reasonable circuit complexity and energy use. While additional adaptation of coefficients of filter 40 may be performed, the sets of coefficients provided to filter 40 may in some example embodiments, be the only adjustment made to filter 40. While the above description is that of a feed-forward (FF) ANC system, a feedback (FB) ANC system may be alternatively employed, e.g., by using playback corrected error signal PBCE as the input to adjustable gain stage 46 as shown in a dashed line, rather than the reference microphone signal Ref.

The coefficients in lookup table 42 may be custom-designed, or may be produced by any of the off-line design processes described in co-pending U.S. patent application Ser. No. 17/468,990 filed on Sep. 8, 2021 and entitled "ACTIVE NOISE CANCELLATION SYSTEM USING INFINITE IMPULSE RESPONSE FILTERING", the disclosure of which is incorporated herein by reference. The sets of coefficients represent a reduced set of potential responses selectable for filter 40, which correspond to nominal users having different head and ear canal characteristics, i.e., to different classes of users, distinguished by those characteristics.

Figure 5:
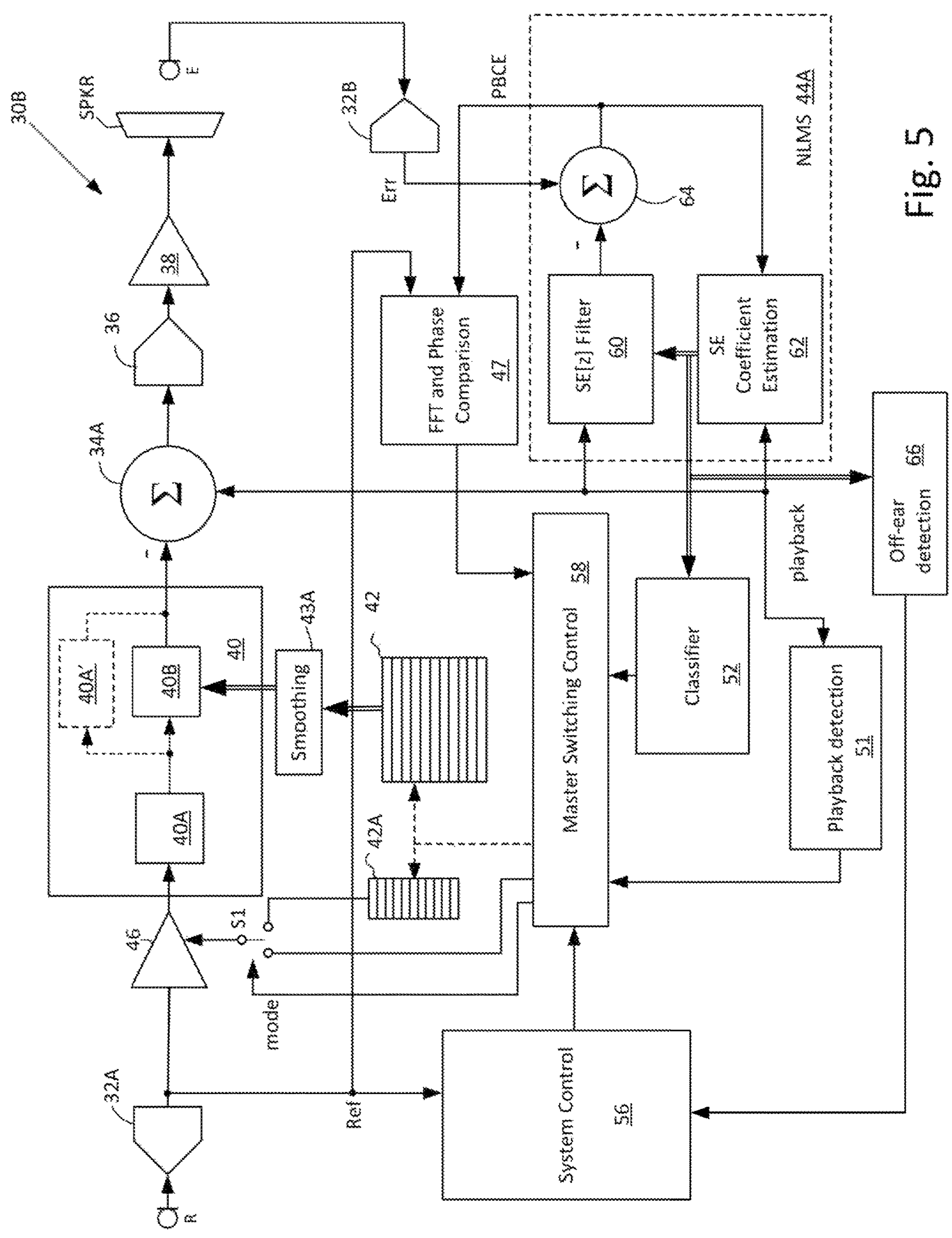
FIG. 5 is a block diagram illustrating another example ANC circuit 30B, in accordance with an embodiment of the disclosure.

Referring now to FIG. 5, a block diagram illustrating another example ANC circuit 30B is shown, in accordance with an embodiment of the disclosure. FIG. 5 includes elements of CODEC IC 20 of FIG. 3 and ANC system 30A of FIG. 4, so only differences between them will be described below. Filter 40 as illustrated may contain both a fixed filter section 40A and a filter section 40B having a selectable (variable) response, and fixed filter section 40A may be connected in a serial cascade as shown, or optionally as a parallel stage 40A' as illustrated as an alternative with dashes. An NLMS 44A is illustrated as an adaptive filter that estimates secondary path response S, by filtering playback signal playback with a secondary path estimate, and removing the resulting playback corrected error signal PBCE from the error microphone signal digital representation provided from ADC 32B. By transforming playback audio playback (ds+ia in FIG. 3) with the estimate of secondary path response S, the playback audio portion of playback, which is removed from error microphone signal Err by a combiner 64, should match the expected version of playback audio playback reproduced at error microphone E, since the electrical and acoustical secondary path S is the path taken by playback audio playback to arrive at error microphone E. Combiner 64 combines error microphone signal representation Err and subtracts playback audio signal playback to produce playback corrected error signal PBCE. To implement the above, a filter SE[z] 60 has coefficients controlled by a SE coefficient estimation block 62, which updates based on correlated components of playback audio playback and playback corrected error PBCE. SE coefficient estimation block 62 correlates the actual playback audio playback with the components of playback audio ds+ia that are present in error microphone signal Err. Filter SE[z] 60 is thereby adapted to generate a signal from playback audio playback, that when subtracted from error microphone signal Err, contains the content of error microphone signal Err that is not due to playback audio playback in playback corrected error signal PBCE.

A playback detection circuit 51 generates a control signal provided to a master switching control block 58, that, when playback audio playback has content, changes a mode of operation of ANC circuit 30B. Alternatively, an indication may be provided from an upstream block indicating that the overall audio system has playback content to master switching control block 58, in order to change the mode of operation. An FFT and phase comparison block 47 encompasses the analysis and phase detection circuits shown in FIG. 4 and described above, which represents a first mode of operation when playback audio playback is absent, in which master switching control block 58 performs selection sets of coefficients from lookup table 42 and adjusts the gain of adjustable gain stage 46. When playback audio playback is present, selection of coefficients, and optionally, adjustment of the gain of adjustable gain stage 46 from another look-up table 42A are performed in response to an output of a classifier block 52 that provides an indication of a classification of secondary path response S, based on known groups of secondary path response S to select a set of coefficients for filter 40 from lookup table 42. A switch S1 selects between control of adjustable gain stage 46 from look-up table 42A according to a state of a control signal mode, so that when playback audio is absent, control of adjustable gain stage is performed in conformity with the phase relationships described above with reference to FIG. 4, and when playback audio is present, selection of a gain value is made from look-up table 42A according to the output of classifier block 52. A smoothing block 43A smooths the values provided from lookup table 42 as updates are made, to reduce artifacts and instabilities that might otherwise be caused by switching coefficient sets. Coefficients provided by SE coefficient estimation block 62 to filter SE[z] 60 are also provided to classifier block 52, which performs a transformation of features that describe secondary path response S, i.e., the SE coefficients, or classifier block 52 may first decompose the coefficients into other descriptors such as poles/zeros or a map of amplitude/phase for different frequencies of interest, before transforming the descriptors into a reduced feature space. Further details of classifier block 52 and the feature transformation re disclosed in co-pending U.S. patent application Ser. No. 17/858,771, filed on Jul. 6, 2022 and entitled "FEED-FORWARD ADAPTIVE NOISE-CANCELING WITH DYNAMIC FILTER SELECTION BASED ON CLASSIFYING ACOUSTIC ENVIRONMENT", the disclosure of which is incorporated herein by reference. Classifier block 52 encompasses other blocks described in the above-cited U.S. Patent Application, including feature transformation, similarity measurement and the ultimate classification of secondary path response S. Classifier block 52 compares the transformed features with a set of stored nominal values and provides the resultant indication to master switching control block 58, which determines whether the SE path has changed sufficiently to require an update, and if so, provides a new index to lookup table 42 to select a response for filter 40.

Figure 6:
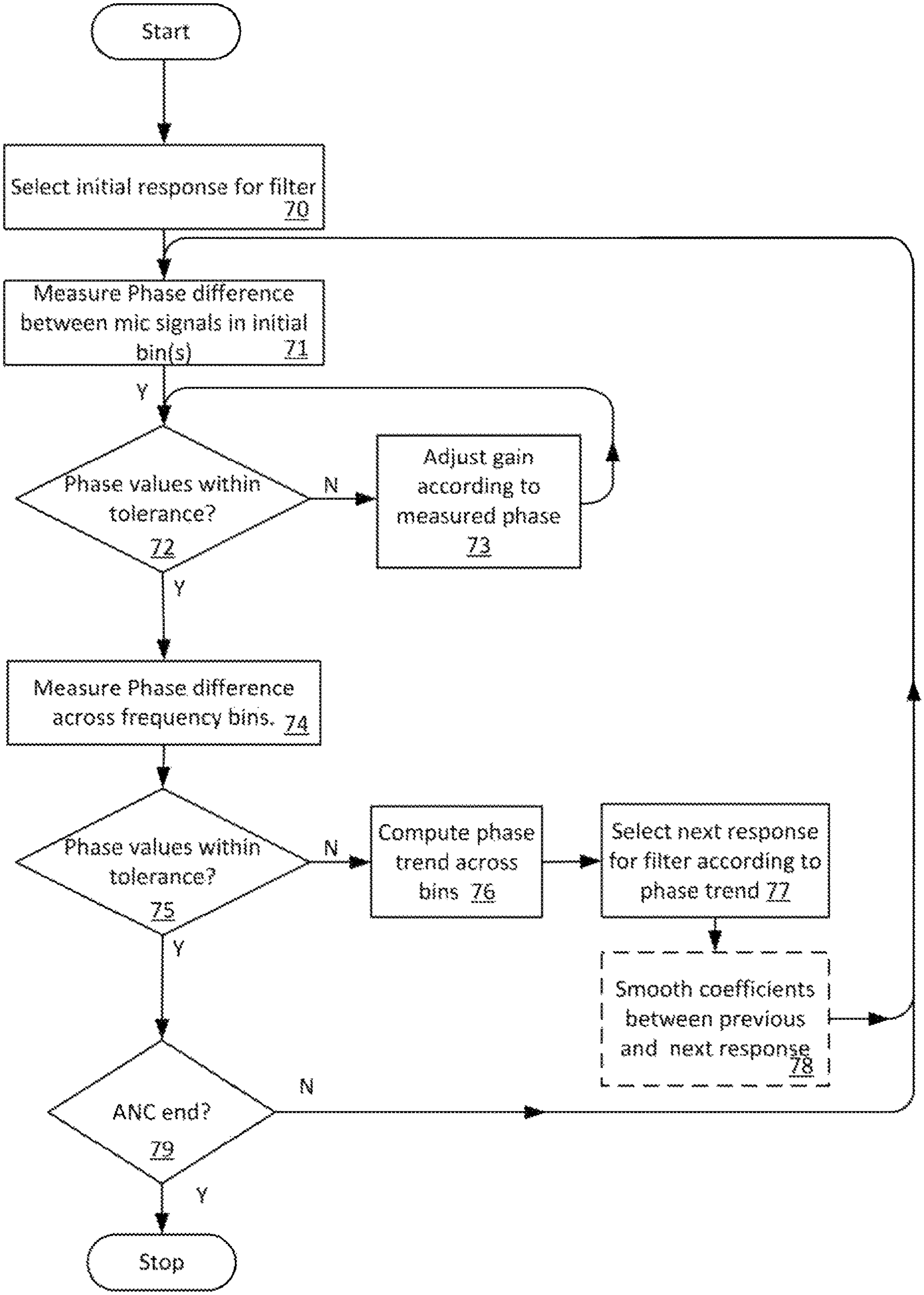
FIG. 6 is a flowchart illustrating operation of an example ANC system, in accordance with an embodiment of the disclosure.

Referring now to FIG. 6, a flowchart illustrates operation of an example ANC systems described above, in accordance with an embodiment of the disclosure. First, an initial response is selected for filter 40 (step 70) and a phase difference between the microphone signals is measured (step 71), which may be averaged across a relatively narrow set of bins compared to the phase comparison used to select the filter in Step 74 below. Until the phase difference value(s) are within a tolerance used for gain adjustment (decision 72), the gain is adjusted according to the measured phase (step 73). Once the gain has been adjusted to obtain an operating gain value for which the phase difference value(s) are within the tolerance (decision 72), the phase differences for the frequency bins used for filter selection are measured (step 74) and if the phase differences are not within a tolerance used for filter selection (decision 75), a phase trend is computed across the frequency bins (step 76) and a next response is selected for filter 40 according to the phase trend (step 77). The coefficients are optionally smoothed between the previous response and the new (updated) response (step 78). In particular, if the number of coefficient sets is large, i.e., the changes between coefficient sets are sufficiently gradual, smoothing may not be needed. Once the response has been updated (step 78), or if the phase differences were already within tolerance in step 75, the gain adjustment process may be entered from step 71. Alternatively, or conditioned upon knowledge that the filter selection in step 77 will not result in a significant change in the gain of the ANC system, the filter selection process may be entered at step 74 instead of repeating the gain calibration. Until ANC operation is ended (decision 79), the process from step 71 to step 78 is repeated.

Figure 7:
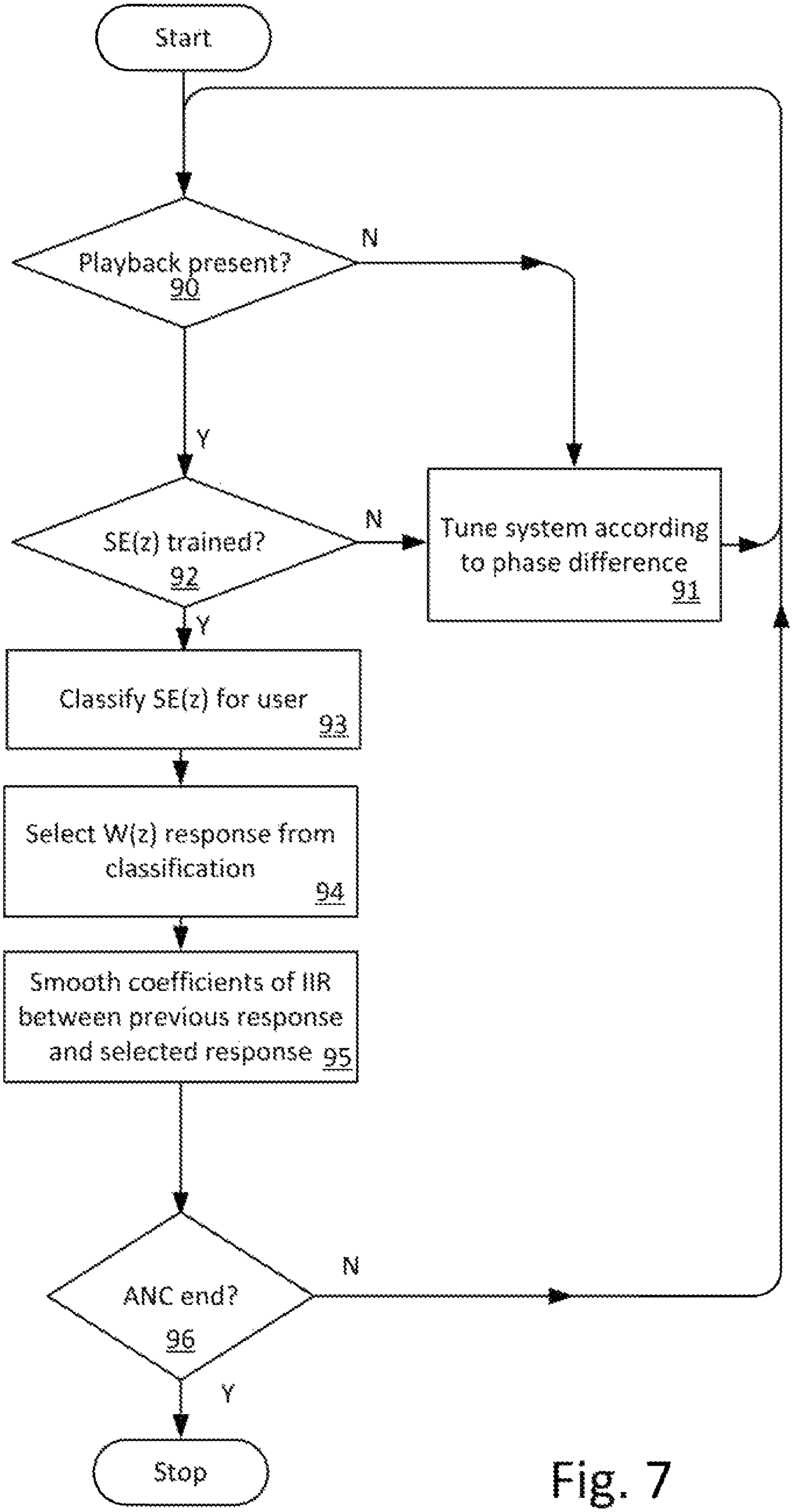
FIG. 7 is a flowchart illustrating operation of an example ANC system, in accordance with an embodiment of the disclosure.

Referring now to FIG. 7, a flowchart illustrates operation of an example ANC systems described above, in accordance with an embodiment of the disclosure. If playback audio is not present (decision 90), or if SE(z) is not trained (decision 92), i.e., if NLMS 44 has converged, then the ANC system is tuned according to the phase difference(s) (step 91), as described above. If playback audio is present (decision 90), then if SE(z) is trained (decision 92), then the user is classified according to SE(z) (step 93), and a response W(z) is selected for filter 40 according to the classification (step 94) and the coefficients are smoothed between the previous response and the new (updated) response (step 95). Until ANC operation is ended (decision 96) the process from step 90 to step 95 is repeated.

As mentioned above, portions of the disclosed processes may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions executed by a digital signal processor (DSP) or other processor that executes computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the block diagram block or blocks.

In summary, this disclosure shows and describes adaptive noise-canceling circuits, systems and methods of operation of the systems and circuits that generates an anti-noise signal from a noise reference signal. The adaptive noise-canceling systems may include a filter for generating the anti-noise signal that has a response controlled by a set of coefficients selected from a collection of coefficient sets, an acoustic output transducer for reproducing a signal containing the anti-noise signal, a first microphone for measuring ambient noise at a first location to produce a first noise measurement signal and a second microphone for measuring the ambient noise at a second location to generate a second noise measurement signal. The adaptive noise-canceling system may include an analysis subsystem for analyzing the first noise measurement signal and the second noise measurement signal and a controller that selects the set of coefficients from the collection of coefficient sets according to a phase difference between the first noise measurement signal and the second noise measurement signal as determined by the analysis subsystem. In some example embodiments, the filter may be an infinite-impulse response (IIR) filter and in other example embodiments, the filter may be a finite-impulse response (FIR) filter.

In some example embodiments, the controller may select an initial set of coefficients for the response of the filter, and the initial set of coefficients may represent a nominal response determined from an average of responses required to compensate for the acoustic environment of the acoustic output transducer over a plurality of potential users. In some example embodiments, the system may include an adjustable gain stage coupled in functional series with the filter, and the controller may, responsive to the phase difference between the first noise measurement signal and the second noise measurement signal, adjust the adjustable gain stage to obtain an operational gain state of a combination of the adjustable gain stage and the filter. The controller may also determine whether the combination of the adjustable gain stage and the filter are in the operational gain state by evaluating a stability of the phase difference between the first noise measurement signal and the second noise measurement signal. In some example embodiments, the controller may determine whether the combination of the adjustable gain stage and the filter are in the operational gain state by evaluating an angle of the phase difference between the first noise measurement signal and the second noise measurement signal. In some example embodiments, the controller may, subsequent to obtaining the operational gain state, further select an operating set of coefficients for the filter according to phase differences between the first noise measurement signal and the second noise measurement signal as determined by the analysis subsystem for multiple corresponding frequency bins, and the controller may evaluate the phase differences to determine a phase trend across the multiple frequency bins, and may further select from among the collection of sets of coefficients for the filter according to the phase trend to obtain the operating set of coefficients. In some example embodiments, the controller may dynamically select the operating set of coefficients to maintain the phase differences across the multiple frequency bins within a predetermined bound.

In some example embodiments, the coefficients may select between multiple filter types and characteristics of the filter and in some example embodiments, the controller may further perform smoothing between selected sets of coefficients when making a change in selection of the set of coefficients. In some example embodiments, the filter may generate the anti-noise signal from the first microphone signal as a noise reference signal to provide a feed-forward architecture.

In some example embodiments, the second location may be proximate the acoustic output transducer, so that the second microphone measures an acoustic environment of the acoustic output transducer to produce the second microphone signal as an error signal. In some example embodiments the filter may generate the anti-noise signal from the error signal to provide a feedback architecture. In some example embodiments, the adaptive noise-canceling system may include a secondary-path estimating adaptive filter that filters the second microphone signal to remove components of the second microphone signal other than the ambient noise to generate the error signal. In some example embodiments, the system may further include a classifier for classifying values of coefficients of the secondary-path estimating adaptive filter to provide a classification indication, and the controller may determine whether the signal containing the anti-noise signal provided to the acoustic output transducer further contains program audio, and may, responsive to determining that the signal containing the anti-noise signal provided to the acoustic output transducer contains the program audio, select the set of coefficients from the collection of coefficient sets according to a phase difference between the first noise measurement signal and the second noise measurement signal as determined by the analysis subsystem, and may, responsive to determining that the signal containing the anti-noise signal provided to the acoustic output transducer does not contain the program audio, select one of the collection of sets of coefficients according to the classification indication provided by the classifier. In some example embodiments, the classifier may transform the second response modeling the secondary acoustic path to a lower-dimensional subspace of parameters, so that the controller may select the set of first coefficients according to the parameters.

It should be understood, especially by those having ordinary skill in the art with the benefit of this disclosure, that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense. Similarly, although this disclosure makes reference to specific embodiments, certain modifications and changes may be made to those embodiments without departing from the scope and coverage of this disclosure. Moreover, any benefits, advantages, or solutions to problems that are described herein with regard to specific embodiments are not intended to be construed as a critical, required, or essential feature or element.

While the disclosure has shown and described particular embodiments of the techniques disclosed herein, it will be understood by those skilled in the art that the foregoing and other changes in form, and details may be made therein without departing from the spirit and scope of the disclosure. For example, the disclosed system may be used to cancel vibration or other non-audio frequency noise.

What is claimed is:

1. An adaptive noise-canceling system for generating an anti-noise signal, the adaptive noise-canceling system comprising:

a filter for generating the anti-noise signal, wherein the filter has a response controlled by a set of coefficients selected from a collection of coefficient sets;

an acoustic output transducer for reproducing a signal containing the anti-noise signal;

a first microphone for measuring ambient noise at a first location to produce a first noise measurement signal;

a second microphone for measuring the ambient noise at a second location to generate a second noise measurement signal;

an analysis subsystem for analyzing the first noise measurement signal and the second noise measurement signal;

an adjustable gain stage coupled in functional series with the filter, and a controller that, responsive to a phase difference between the first noise measurement signal and the second noise measurement signal as determined by the analysis subsystem, adjusts the adjustable gain stage to obtain an operational gain state of a combination of the adjustable gain stage and the filter, wherein the controller, responsive to the operational gain state being achieved, selects the set of coefficients from the collection of coefficient sets for one of multiple on-ear conditions of operation, according to the phase difference between the first noise measurement signal and the second noise measurement signal, and wherein the controller, subsequent to selecting the set of coefficients, continues to monitor the phase difference and dynamically updates the selection of the set of coefficients to maintain the phase difference within a predetermined bound.

2. The adaptive noise-canceling system of claim 1, wherein the controller selects an initial set of coefficients for the response of the filter, wherein the initial set of coefficients represents a nominal response determined from an average of responses required to compensate for the acoustic environment of the acoustic output transducer over a plurality of potential users.

3. The adaptive noise-canceling system of claim 1, wherein the controller determines whether the combination of the adjustable gain stage and the filter are in the operational gain state by evaluating a stability of the phase difference between the first noise measurement signal and the second noise measurement signal.

4. The adaptive noise-canceling system of claim 1, wherein the controller determines whether the combination of the adjustable gain stage and the filter are in the operational gain state by evaluating an angle of the phase difference between the first noise measurement signal and the second noise measurement signal.

5. The adaptive noise-canceling system of claim 1, wherein the controller, subsequent to obtaining the operational gain state, further selects an operating set of coefficients for the filter according to phase differences between the first noise measurement signal and the second noise measurement signal as determined by the analysis subsystem for multiple corresponding frequency bins.

6. The adaptive noise-canceling system of claim 5, wherein the controller evaluates the phase differences to determine a phase trend across the multiple frequency bins, and further selects from among the collection of sets of coefficients for the filter according to the phase trend to obtain the operating set of coefficients.

7. The adaptive noise-canceling system of claim 5, wherein the controller dynamically selects the operating set of coefficients to maintain the phase differences across the multiple frequency bins within a predetermined bound.

8. The adaptive noise-canceling system of claim 1, wherein the coefficients select between multiple filter types and characteristics of the filter.

9. The adaptive noise-canceling system of claim 1, wherein the controller further performs smoothing between selected sets of coefficients when making a change in selection of the set of coefficients.

10. The adaptive noise-canceling system of claim 1, wherein the filter generates the anti-noise signal from the first microphone signal as a noise reference signal to provide a feed-forward architecture.

11. The adaptive noise-canceling system of claim 1, wherein the second location is proximate the acoustic output transducer, whereby the second microphone measures an acoustic environment of the acoustic output transducer to produce the second microphone signal as an error signal, and wherein the filter generates the anti-noise signal from the error signal to provide a feedback architecture.

12. The adaptive noise-canceling system of claim 1, wherein the second location is proximate the acoustic output transducer, whereby the second microphone measures an acoustic environment of the acoustic output transducer to produce the second microphone signal, and wherein the adaptive noise-canceling system further comprises a secondary-path estimating adaptive filter that filters the second microphone signal to remove components of the second microphone signal other than the ambient noise to generate the error signal.

13. The adaptive noise-canceling system of claim 12, further comprising a classifier for classifying values of coefficients of the secondary-path estimating adaptive filter to provide a classification indication, wherein the controller determines whether the signal containing the anti-noise signal provided to the acoustic output transducer further contains program audio, wherein the controller, responsive to determining that the signal containing the anti-noise signal provided to the acoustic output transducer contains the program audio, selects the set of coefficients from the collection of coefficient sets according to a phase difference between the first noise measurement signal and the second noise measurement signal as determined by the analysis subsystem, and wherein the controller, responsive to determining that the signal containing the anti-noise signal provided to the acoustic output transducer does not contain the program audio, selects one of the collection of sets of coefficients according to the classification indication provided by the classifier.

14. The adaptive noise-canceling system of claim 13, wherein the classifier transforms the second response modeling the secondary acoustic path to a lower-dimensional subspace of parameters, whereby the controller selects the set of first coefficients according to the parameters.

15. The adaptive noise-canceling system of claim 1, wherein the filter is an infinite-impulse response (IIR) filter.

16. The adaptive noise-canceling system of claim 1, wherein the filter is a finite-impulse response (FIR) filter.

17. A method of canceling effects of ambient noise, the method comprising:

sensing the ambient noise with a first acoustic sensor of an adaptive noise-canceling system at a first location to generate a first noise reference signal;

sensing the ambient noise with a second acoustic sensor of the adaptive noise-canceling system at a second location to generate a second noise reference signal;

generating an anti-noise signal with a filter having a selectable response to reduce the presence of the ambient noise, wherein the filter has a response selected by a set of coefficients selected from a collection of coefficient sets;

providing the anti-noise signal to an output electroacoustic transducer;

analyzing the first noise measurement signal and the second noise measurement signal to obtain a phase difference between the first noise measurement signal and the second noise measurement signal;

adjusting an adjustable gain stage coupled in functional series with the filter in response to the phase difference obtained by the analyzing, to obtain an operational gain state of a combination of the adjustable gain stage and the filter;

responsive to the operational gain state being achieved, controlling a response of the filter by selecting the set of coefficients for multiple on-ear conditions of operation, from the collection of coefficient sets according to the phase difference obtained by the analyzing; and subsequent to selecting the set of coefficients, monitoring the phase difference and dynamically updating the selection of the set of coefficients to maintain the phase difference within a predetermined bound.

18. The method of claim 17, further comprising selecting an initial set of coefficients for the response of the filter prior to performing the analyzing and controlling, wherein the initial set of coefficients represents a nominal response determined from an average of responses required to compensate for the acoustic environment of the acoustic output transducer over a plurality of potential users.

19. The method of claim 17, further comprising determining whether the combination of the adjustable gain stage and the filter are in the operational gain state by evaluating a stability of the phase difference obtained by the analyzing.

20. The method of claim 17, further comprising determining whether the combination of the adjustable gain stage and the filter are in the operational gain state by evaluating an angle of the phase difference between the first noise measurement signal and the second noise measurement signal.

21. The method of claim 17, wherein the analyzing obtains multiple phase differences between the first noise measurement signal and the second noise measurement signal for multiple corresponding frequency bins, and wherein the controlling, subsequent to obtaining the operational gain state, further selects an operating set of coefficients for the filter according to the multiple phase differences for the multiple corresponding frequency bins.

22. The method of claim 21, further comprising evaluating the multiple phase differences to determine a phase trend across the multiple frequency bins, and wherein the controlling selects from among the collection of sets of coefficients for the filter according to the phase trend to obtain the operating set of coefficients.

23. The method of claim 21, wherein the controlling dynamically selects the operating set of coefficients to maintain the multiple phase differences across the multiple frequency bins within a predetermined bound.

24. The method of claim 17, wherein the coefficients select between multiple filter types and characteristics of the filter.

25. The method of claim 17, further comprising smoothing between selected sets of coefficients when the controlling makes a change in selection of the set of coefficients.

26. The method of claim 17, wherein the generating generates the anti-noise signal from the first microphone signal as a noise reference signal to provide a feed-forward architecture.

27. The method of claim 17, wherein the second location is proximate the acoustic output transducer, whereby the second microphone measures an acoustic environment of the acoustic output transducer to produce the second microphone signal as an error signal, and wherein the filter generates the anti-noise signal from the error signal to provide a feedback architecture.

28. The method of claim 17, wherein the second location is proximate the acoustic output transducer, whereby the second microphone measures an acoustic environment of the acoustic output transducer to produce the second microphone signal, and wherein the adaptive noise-canceling system further comprises a secondary-path estimating adaptive filter that filters the second microphone signal to remove components of the second microphone signal other than the ambient noise to generate the error signal.

29. The method of claim 28, further comprising:

classifying values of coefficients of the secondary-path estimating adaptive filter to provide a classification indication;

determining whether or not the signal containing the anti-noise signal provided to the acoustic output transducer further contains program audio;

responsive to determining that the signal containing the anti-noise signal provided to the acoustic output transducer contains the program audio, the controlling selects the set of coefficients from the collection of coefficient sets according to the phase difference obtained by the analyzing; and responsive to determining that the signal containing the anti-noise signal provided to the acoustic output transducer does not contain the program audio, the controlling selects one of the collection of sets of coefficients according to the classification indication provided by the classifier.

30. The method of claim 29, wherein the classifying transforms the second response modeling the secondary acoustic path to a lower-dimensional subspace of parameters, whereby the controlling selects the set of first coefficients according to the parameters.

31. The method of claim 17, wherein the filter is an infinite-impulse response (IIR) filter.

32. The method of claim 17, wherein the filter is a finite-impulse response (FIR) filter.

* * * * *